(12) United States Patent
Wu

(10) Patent No.: US 10,906,421 B2
(45) Date of Patent: Feb. 2, 2021

(54) WIRELESS AUTOMATIC CHARGING SYSTEM FOR ELECTRIC VEHICLES

(71) Applicant: Chien-Chen Wu, Taipei (TW)

(72) Inventor: Chien-Chen Wu, Taipei (TW)

( * ) Notice: Subject to any disclaimer, the term of this patent is extended or adjusted under 35 U.S.C. 154(b) by 85 days.

(21) Appl. No.: 16/228,788

(22) Filed: Dec. 21, 2018

(65) Prior Publication Data

US 2019/0193586 A1 Jun. 27, 2019

(30) Foreign Application Priority Data

Dec. 25, 2017 (TW) .............................. 106145474 A

(51) Int. Cl.
*H02J 7/00* (2006.01)
*B60L 53/38* (2019.01)
*B60L 53/126* (2019.01)
*B60L 53/64* (2019.01)
*B60L 53/66* (2019.01)

(52) U.S. Cl.
CPC ............. *B60L 53/38* (2019.02); *B60L 53/126* (2019.02); *B60L 53/64* (2019.02); *B60L 53/66* (2019.02)

(58) Field of Classification Search
CPC ........ B60L 53/38; B60L 53/126; B60L 53/64; B60L 53/66; B60L 53/12; B60L 53/68; B60L 53/65
USPC ........................................................ 320/109
See application file for complete search history.

(56) References Cited

U.S. PATENT DOCUMENTS

| | | | |
|---|---|---|---|
| 2011/0227531 A1* | 9/2011 | Rajakaruna ........... | B60L 3/0069 320/109 |
| 2013/0033227 A1* | 2/2013 | Gibbons, Jr. ......... | B60L 53/126 320/108 |
| 2014/0327391 A1* | 11/2014 | Niederhauser ........ | B60L 53/126 320/108 |
| 2019/0039471 A1* | 2/2019 | Moghe ................ | H02J 7/00034 |

* cited by examiner

*Primary Examiner* — Jack Chiang
*Assistant Examiner* — Brandon Bowers
(74) *Attorney, Agent, or Firm* — Chun-Ming Shih; Lanway IPR Services

(57) ABSTRACT

A wireless automatic charging system for electric vehicles is disclosed, wherein the electric vehicle comprises a charging board, a Bluetooth device, a battery, as well as a battery management module electrically connected to the aforementioned charging board, Bluetooth device and battery and capable of detecting and recording the charging efficiency data concerning the charging board, and wherein the wireless automatic charging system for electric vehicles comprises a base seat, an air inflation and deflation device, a discharging board and a control console, wherein the battery management module in the electric vehicle can transfer the charging-related information of the electric vehicle to the control console via the Bluetooth module such, and adjust the distance between the charging board and the discharging board and/or charging power of the discharging board in accordance with the received charging efficiency data and the charging efficiency adjustment data.

3 Claims, 7 Drawing Sheets

WIRELESS AUTOMATIC CHARGING SYSTEM FOR ELECTRIC VEHICLES

BACKGROUND OF THE INVENTION

1. Field of the Invention

The present invention generally relates to a wireless automatic charging system for electric vehicles; in particular, it relates to a wireless automatic charging system for electric vehicles capable of charging an electric vehicle in a wireless charging fashion and adjusting the distance between the charging board and the discharging board and/or the charging power thereby adjusting its charging efficiency.

2. Description of Related Art

It is well known that so-called "wireless charging" largely indicates technologies concerning the acquisition of electric power by an electronic product equipped with battery devices through wireless inductions for electric power charging. Accordingly, compared with typical wired charging approaches, the wireless charging technology provides several advantages because of the design features in terms of no power conduction contact points, such as preventing electric shock risks, enabling higher safety, reducing damages to power transmission components, and also avoiding ageing and oxidation issues caused by environmental impacts, thereby improving the durability of the equipment. In addition, the most significant advantage of the wireless charging technology lies in the convenience thereof; that is, the electric device needs not to be connected by wires, but simply placed on or close to the wireless charger in order to start power charging.

At present, the wireless charging technology is mainly applied to electric vehicles and electric motorcycles, most of which are provided with a charging board electrically connected to the battery installed in the electric vehicle and electric motorcycle, and a discharging board is set up in a charging station; in this way, when the charging board installed in the electric vehicle and the electric motorcycle gets close to the discharge board, wireless charging can be performed. However, most of the current charging stations are unable to adjust the charging efficiency based on the types of electric vehicles and electric motorcycles, which may result in some undesirable situations, e.g., uneven charging duration of time, and the elongated, tedious waiting time for completing the power charging process may negatively affect drivers. Therefore, how to achieve the best charging efficiency has become an urgent problem to be resolved.

As such, it would be an optimal solution if it is possible to charge an electric vehicle by means of the wireless charging process and adjust the distance between the charging board and the discharging board and/or the charging power of the discharging board in accordance with various vehicle types and charging efficiency data thereby adjusting its charging efficiency.

SUMMARY OF THE INVENTION

A wireless automatic charging system for electric vehicles capable of achieving the aforementioned objectives is disclosed, which is applicable to be installed in an electric vehicle for electric power charging, wherein the electric vehicle comprises a charging board, a Bluetooth device, a battery, as well as a battery management module electrically connected to the aforementioned charging board, Bluetooth device and battery and capable of detecting and recording the charging efficiency data concerning the charging board, and wherein the wireless automatic charging system for electric vehicles comprises: a base seat, internally including an accommodation space; a discharging board, with the two sides thereof being respectively installed with an elastic connector connected to the inner sidewall of the accommodation space in the base seat, in which the discharging board is electrically connected to a power source; an air inflation and deflation device, including at least an air cushion body and an air inflation and deflation pump, in which the air cushion body is installed inside the accommodation space of the base seat, the discharging board is fixedly located on the surface of the air cushion body, and the air inflation and deflation pump can operate to inflate or deflate the air cushion body such that the height of the surface of the discharging board can increase by air inflation or decrease by air deflation; and a control console, including: a microprocessor, electrically connected to the air inflation and deflation device and the discharging board; a storage unit, electrically connected to the microprocessor and applied to save the charging efficiency adjustment data about different types of electric vehicles; and a Bluetooth device, electrically connected to the microprocessor for receiving charging-related information which may include at least the car type, charging specification and charging efficiency data; wherein the battery management module in the electric vehicle can transfer the charging-related information of the electric vehicle to the control console via the Bluetooth module such that the control console can operate the discharging board to perform wireless automating charging onto the charging board, and adjust the surface height and/or charging power of the discharging board in accordance with the received charging efficiency data and the charging efficiency adjustment data thereby adjusting its charging efficiency.

More specifically, the base seat can be fixedly locked to the ground by means of a locking component.

More specifically, the lateral side of the base seat can be further installed with a cover.

More specifically, the aforementioned wireless automatic charging system for electric vehicles further comprises a voice device electrically connected to the microprocessor for generating voice audio signals to tell the position that the electric vehicle should move to such that the position of the charging board on the electric vehicle can be moved to the corresponding position of the discharging board.

More specifically, the surface of the discharging board is set up with at least a position sensor electrically connected to the microprocessor.

DETAILED DESCRIPTION OF THE PREFERRED EMBODIMENTS

Figure 1A:
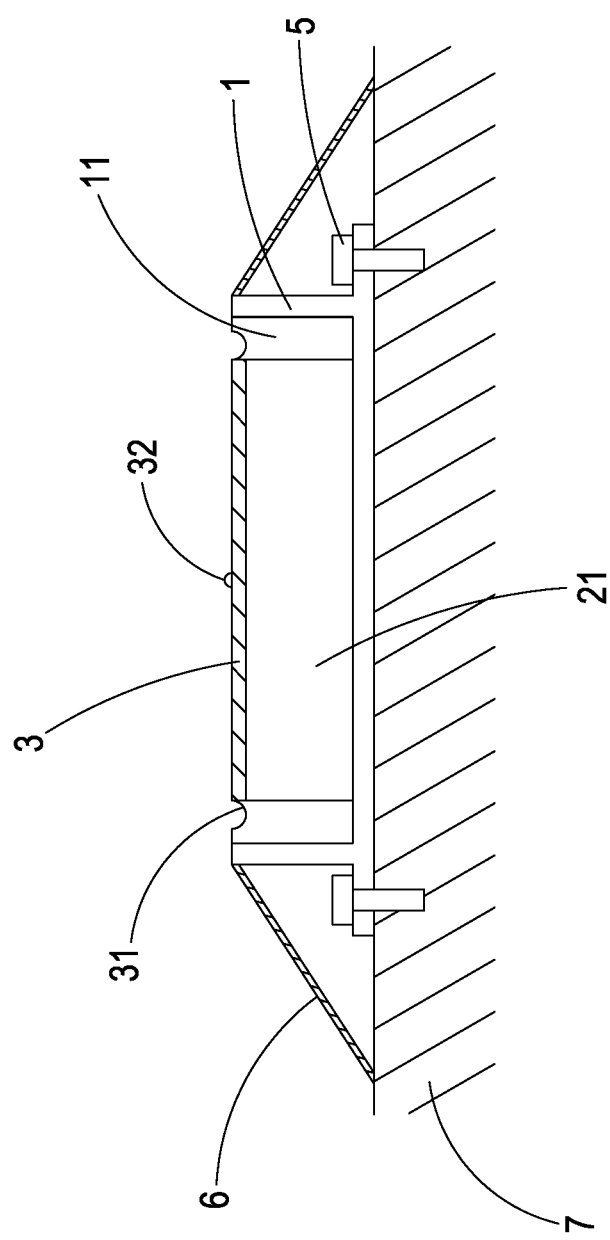
FIG. 1A shows a structure view of the power charging configuration in the wireless automatic charging system for electric vehicles according to the present invention.
Figure 1B:
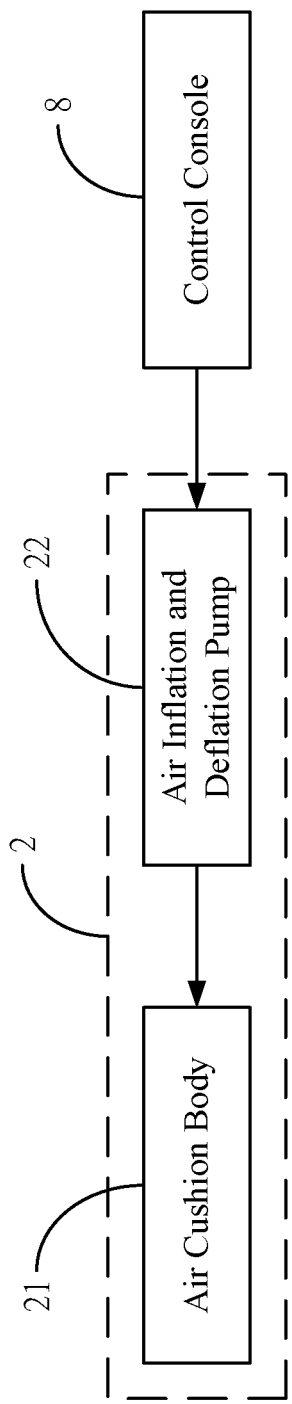
FIG. 1B shows an architecture view of the air inflation and deflation device in the wireless automatic charging system for electric vehicles according to the present invention.
Figure 1C:
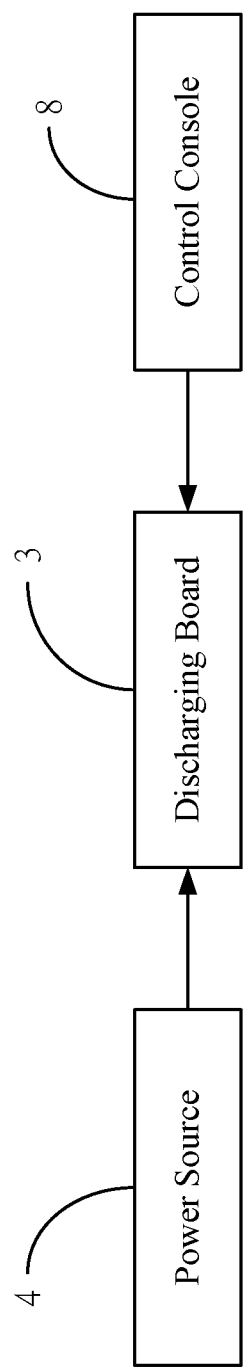
FIG. 1C shows an architecture view of the power supply in the wireless automatic charging system for electric vehicles according to the present invention.
Figure 1D:
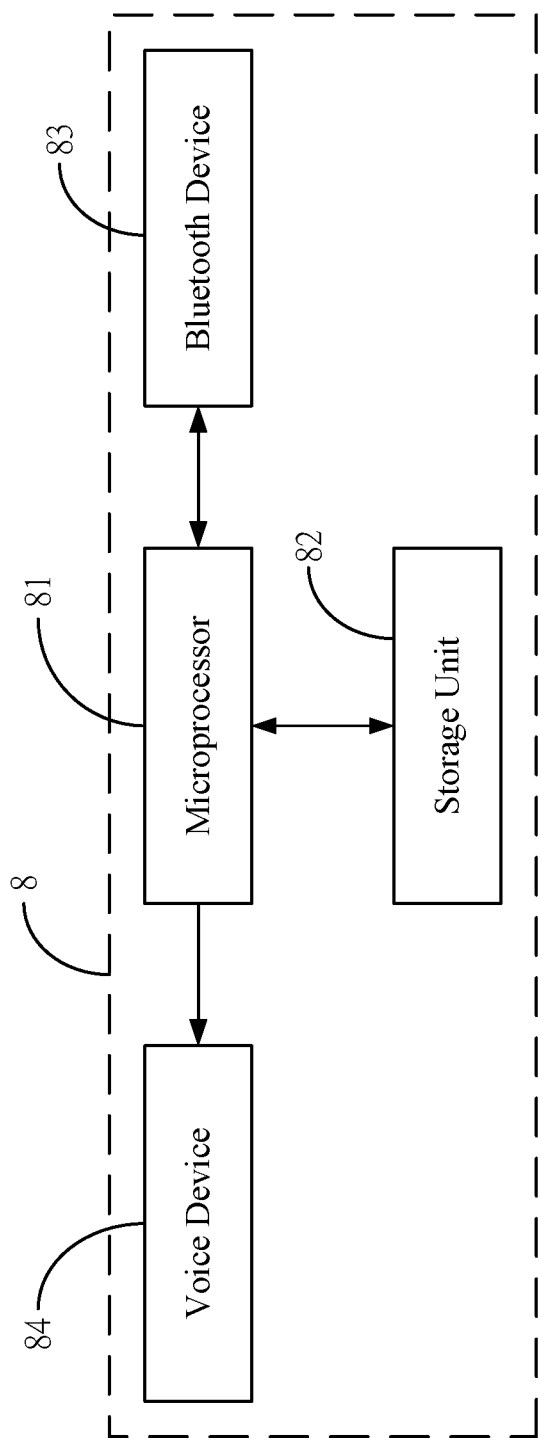
FIG. 1D shows an architecture view of the control console in the wireless automatic charging system for electric vehicles according to the present invention.

Other technical contents, aspects and effects in relation to the present invention can be clearly appreciated through the detailed descriptions concerning the preferred embodiments of the present invention in conjunction with the appended drawings.

Refer first to FIGS. 1A-1D, wherein a structure view of the power charging configuration, an architecture view of the air inflation and deflation device, an architecture view of the power supply as well as an architecture view of the control console in the wireless automatic charging system for electric vehicles according to the present invention are respectively shown. It can be seen that the illustrated wireless automatic charging system for electric vehicles comprises a base seat 1, a discharging board 3, an air inflation and deflation device 2 and a control console 8, herein the inside of the base seat 1 includes an accommodation space 11, and the base seat 1 can be fixedly locked to ground 7 by means of a locking component 5; besides, the lateral side of the base seat 1 is further installed with a cover 6 for covering up the locking component 5.

In addition, the two sides of the discharging board 3 are respectively installed with an elastic connector 31 connected to the inner sidewall of the accommodation space 11 in the base seat 1, and the discharging board 3 is electrically connected to a power source 4; also, the surface of the discharging board 3 is installed with at least a position sensor 32 electrically connected to the microprocessor 81 in the control console 8.

Also, the air inflation and deflation device 2 includes at least an air cushion body 21 and an air inflation and deflation pump 22, in which the air cushion body 21 is installed inside the accommodation space 11 of the base seat 1, the discharging board 3 is fixedly located on the surface of the air cushion body 21, and the air inflation and deflation pump 22 can operate to inflate or deflate the air cushion body 21 such that the height of the surface of the discharging board 3 can increase by air inflation or decrease by air deflation.

Moreover, the control console 8 includes a microprocessor 81, a storage unit 82, a Bluetooth device 83 and a voice device 84, in which the microprocessor 81 is applied to control the operations of the control console 8, while the storage unit 82 can save the charging efficiency adjustment data concerning various types of electric vehicles.

The Bluetooth device 83 can receive charging-related information including at least the car type, charging specification and charging efficiency data, and the voice device 84 can generate voice audio signals to tell the position that the electric vehicle should move to, such that the electric vehicle can move to the corresponding position of the discharging board 3 in the wireless charging equipment 2.

Figure 2:
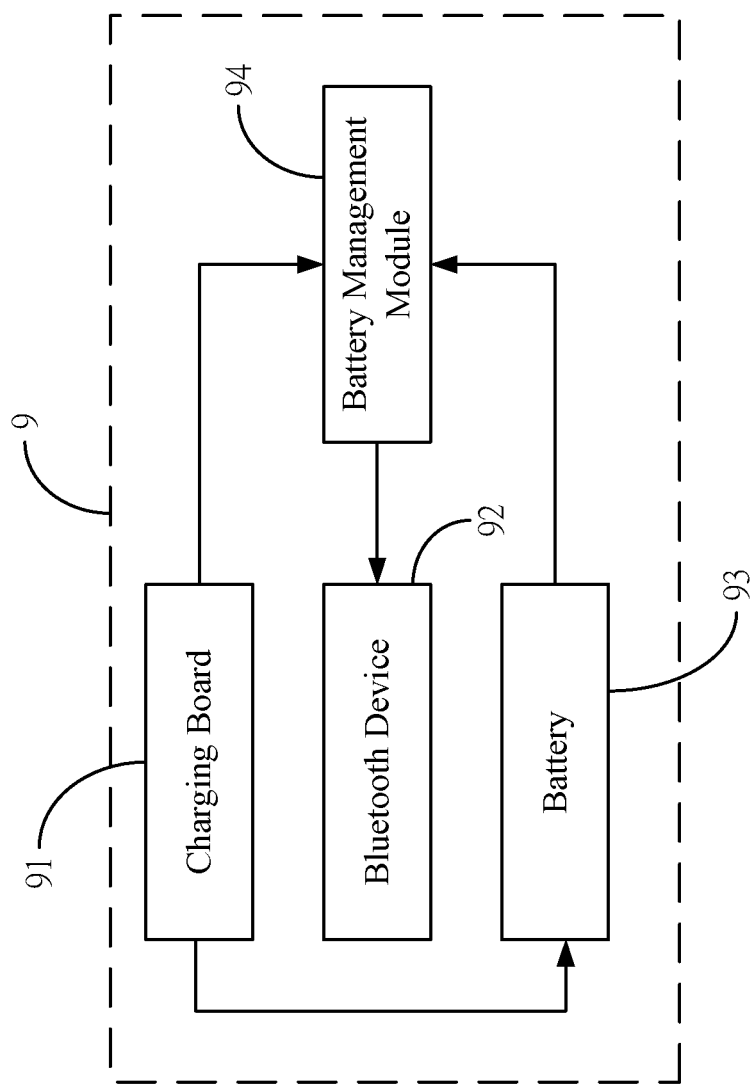
FIG. 2 shows an architecture view of the electric vehicle in the wireless automatic charging system for electric vehicles according to the present invention.

Next, as shown in FIG. 2, the electric vehicle 9 comprises a charging board 91, a Bluetooth device 92, a battery 93 and a battery management module 94 electrically connected to the aforementioned charging board 91, Bluetooth device 92 and battery 93, in which the battery management module 94 can detect and record the charging efficiency data concerning the charging board 91, the Bluetooth device 92 can transfer the charging-related information of the electric vehicle 9 to the control console 8, and said charging-related information may include the vehicle types, charging specification and charging efficiency data.

Figure 3:
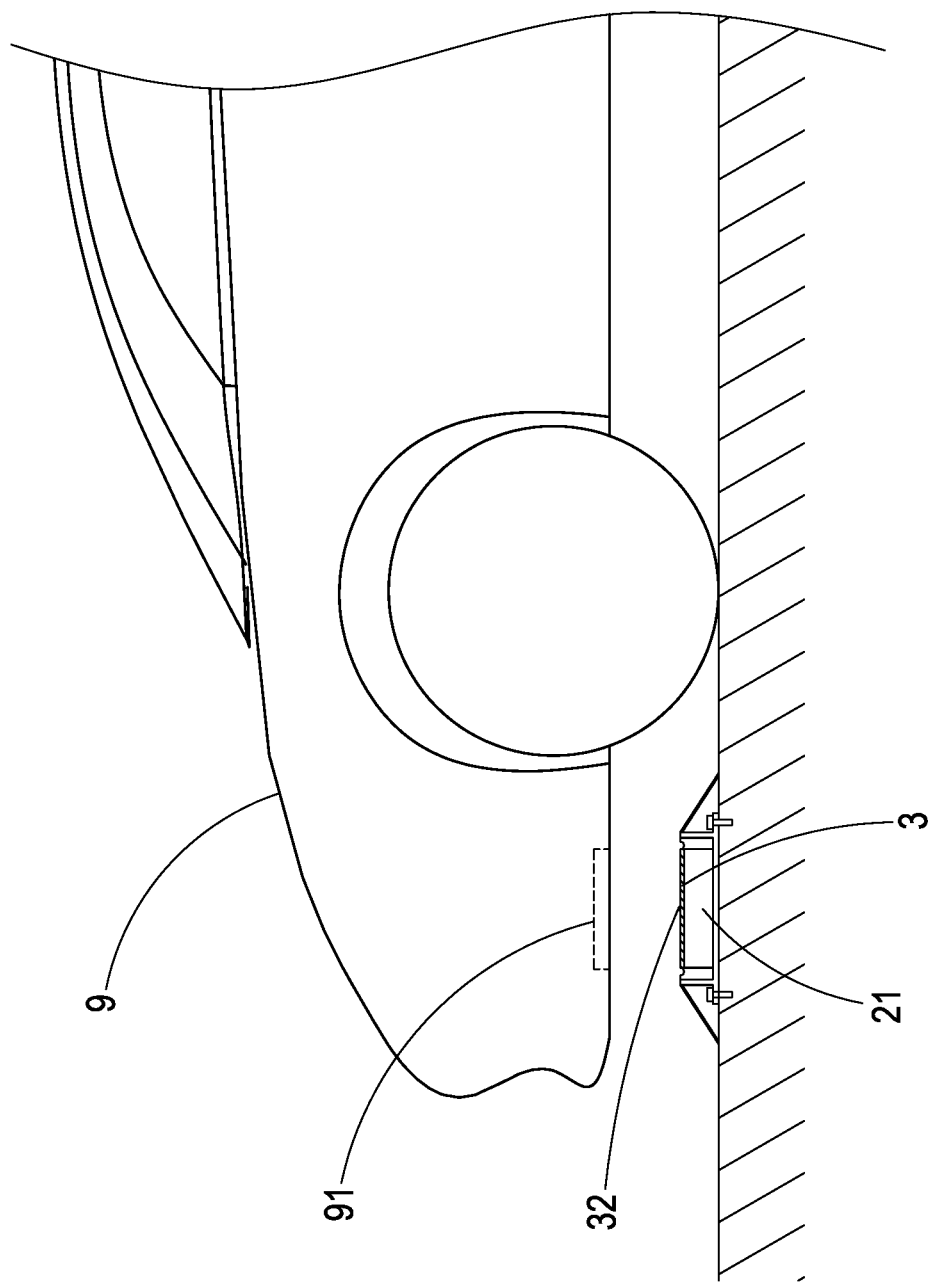
FIG. 3 shows an implementation view of the wireless charging operation in the wireless automatic charging system for electric vehicles according to the present invention.

Accordingly, to perform electric power charging operations in the present embodiment of the illustrated electric vehicle 9, as shown in FIG. 3, the electric vehicle 9 can move forwards, and since the surface of the discharging board 3 is configured with at least a position sensor 32, after the electric vehicle 9 moves to a position where the position sensor 32 can detect, the Bluetooth device 92 of the electric vehicle 9 can transfer the charging-related information concerning the electric vehicle 9 to the control console 8 which can then operate the discharging board 3 to perform wireless automatic charging onto the charging board 91.

Figure 4:
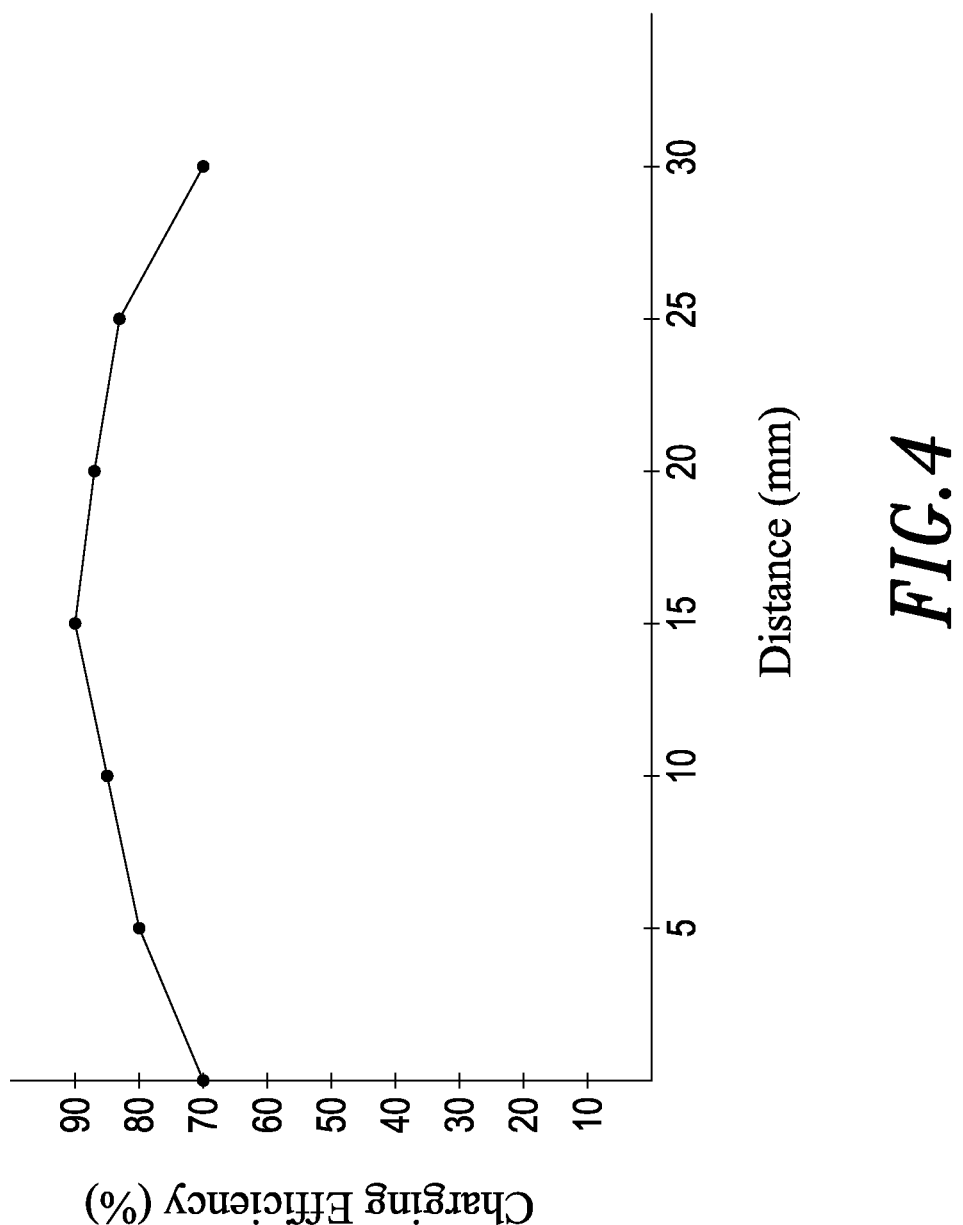
FIG. 4 shows a diagram illustrating the relationship between the charging efficiency and the distance in the wireless automatic charging system for electric vehicles according to the present invention.

Besides, the Bluetooth device 92 in the electric vehicle 9 can subsequently further return the charging efficiency data to the control console 8, and then the control console 8 may adjust the height of the surface of the discharging board 3 or the charging power in accordance with the charging efficiency data and the charging efficiency adjustment data thereby adjusting its charging efficiency, as shown in FIG. 4; e.g., it may adjust the distance between the discharging board 3 and the charging board 91 to 15 mm so as to let the charging efficiency achieve up to 90%, for example.

In comparison with other conventional technologies, the wireless automatic charging system for electric vehicles according to the present invention provides the following advantages:

(1) The present invention allows to charge an electric vehicle by means of the wireless charging process and adjust the distance between the charging board and the discharging board and/or the charging power of the discharging board in accordance with various vehicle types and charging efficiency data thereby adjusting its charging efficiency.

(2) Upon performing power charging, the present invention allows the system vendors to acquire information about the electric vehicles, and vendors can also provide value-added information to the owners of the electric vehicles; in addition, the drive history records of the electric vehicles can be sent to the vehicle factory as feedbacks in order to maintain the best conditions in the electric vehicle and improve consumer's satisfactory.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A wireless automatic charging system for electric vehicles, wherein the electric vehicle comprises a charging board, a Bluetooth device, a battery, as well as a battery management module electrically connected to the aforementioned charging board, Bluetooth device and battery and capable of detecting and recording the charging efficiency data concerning the charging board, and wherein the wireless automatic charging system is mounted on a ground and comprises:

a base seat, internally including an accommodation space, wherein the base seat is fixedly locked to the ground by means of a locking component, and a side space is formed among a lateral side of the base seat, the cover, and the ground to accommodate the locking component;

a discharging board, with the two sides thereof being respectively installed with an elastic connector connected to the inner sidewall of the accommodation space in the base seat, in which the discharging board is electrically connected to a power source;

an air inflation and deflation device, including at least an air cushion body and an air inflation and deflation pump, in which the air cushion body is installed inside the accommodation space of the base seat, the discharging board is fixedly located on the surface of the air cushion body, and the air inflation and deflation pump can operate to inflate or deflate the air cushion body such that the height of the surface of the discharging board can increase by air inflation or decrease by air deflation, wherein the elastic connector and the air inflation and deflation device are separated from each other; and a control console, including:
a microprocessor, electrically connected to the air inflation and deflation device and the discharging board;
a storage unit, electrically connected to the microprocessor and applied to save the charging efficiency adjustment data about different types of electric vehicles; and
a Bluetooth device, electrically connected to the microprocessor for receiving charging-related information which may include at least the car type, charging specification and charging efficiency data;

wherein the battery management module in the electric vehicle can transfer the charging-related information of the electric vehicle to the control console via the Bluetooth module such that the control console can operate the discharging board to perform wireless automating charging onto the charging board, and adjust the surface height and/or charging power of the discharging board in accordance with the received charging efficiency data and the charging efficiency adjustment data thereby adjusting its charging efficiency.

2. The wireless automatic charging system for electric vehicles according to claim 1, further comprising a voice device electrically connected to the microprocessor for generating voice audio signals to tell the position that the electric vehicle should move to such that the position of the charging board on the electric vehicle can be moved to the corresponding position of the discharging board.

3. The wireless automatic charging system for electric vehicles according to claim 1, wherein the surface of the discharging board is set up with at least a position sensor electrically connected to the microprocessor.

* * * * *